United States Patent

[11] 3,603,744

[72] Inventors Lester Q. Krasin
Dallas;
Clifford E. Greene, Fort Worth, both of, Tex.
[21] Appl. No. 839,419
[22] Filed July 7, 1969
Division of Ser. No. 491,106, Sept. 29, 1965, Pat. No. 3,475,561
[45] Patented Sept. 7, 1971
[73] Assignee Superior Continental Corporation

[54] LINE TAP UNIT FOR TELEPHONE SYSTEM
9 Claims, 13 Drawing Figs.

[52] U.S. Cl. .......... 179/170.8, 179/81 B
[51] Int. Cl. .......... H04b 3/24, H04m 1/60
[50] Field of Search .......... 179/81 A, 81 B, 170.2, 170.8, 1 F

[56] References Cited

UNITED STATES PATENTS 3,305,646 2/1967 Brady et al. .......... 179/170.2 X
3,395,255 7/1968 Clement .......... 179/81 B
3,483,335 12/1969 Piotrowski .......... 179/170.8 X

*Primary Examiner*—Kathleen H. Claffy
*Assistant Examiner*—William A. Helvestine
*Attorney*—Owen, Wickersham & Erickson

ABSTRACT: A line tap unit for use in combination with telephone facilities including a central office station having a plurality of central office terminals comprised of channel units with receiver and transmitter sections from which extend a two-conductor transmission line. The line tap units connected to each transmission line at locations remote from the central office terminal include a receiver section operable at the same frequency as a transmitter section of one central office channel unit and a transmitter section operable at another frequency which is the same frequency as a receiver section of the same central office channel unit. Each line tap unit has means for extracting low frequency power from the transmission line to operate its receiver and transmitter sections and coordination control means responsive to the signal received from its central office terminal for automatically adjusting the signal output of its transmitter section so that all signals arrive at a central office terminal at the same level. The coordination control means includes regulator means for comparing a received signal against a fixed reference and for producing a feedback signal proportional to the difference between the received signal and the fixed reference.

INVENTORS
LESTER Q. KRASIN
CLIFFORD E. GREENE
BY
Owen, Wickersham & Erickson
ATTY'S.

INVENTORS
LESTER O. KRASIN
CLIFFORD E. GREENE
BY
Owen, Wickersham & Erickson
ATTY'S.

INVENTORS
LESTER Q. KRASIN
CLIFFORD E. GREENE
BY
Owen, Wickersham & Erickson
ATTY'S

LINE TAP UNIT FOR TELEPHONE SYSTEM

This application is a division of application Ser. No. 491,106, filed Sept. 29, 1965, now U.S. Pat. No. 3,475,561.

A general object of the present invention is to provide an electronic distribution system which can greatly increase the subscriber service capabilities of conventional telephone facilities utilizing a two-conductor transmission line at a cost that is less than that of installing additional pairs of conductors to the conventional system.

Prior to the present invention carrier systems were devised to add additional circuits to trunk lines between central office exchanges, usually at least fifty and often several hundred miles apart. Their need arose in rapidly growing areas which lacked sufficient conventional telephone facilities. Because of their high cost and inherent complexity such systems were practical for use only in areas where trained personnel were available and where their cost could compete favorably with the installation of additional physical conductors between two stations of a conventional telephone system. Later carrier systems heretofore adapted for subscriber use comprised essentially the carrier equipment that was designed for trunk use combined with signaling equipment that would enable it to be connected directly to subscriber's telephone. Such systems had all of the problems of the trunk carrier, plus some new ones; they were costly as well as complex and consequently had to be installed and maintained by highly trained technical people with engineering capabilities.

In contrast with the carrier subscriber systems heretofore devised, the present invention provides an electronic distribution system that can be manufactured, installed, and maintained at relatively low cost compared with the cost of installing additional conductor pairs of conventional telephone systems at distances preferably greater than three miles. It also provides system equipment that eliminates the necessity for any field adjustment of components so that the equipment can be installed and tested by the same class of telephone company personnel that ordinarily installs telephones in a subscriber's residence. Our invention thus eliminates the need for complicated test equipment and technical competence which is not ordinarily prevalent in many areas served by the telephone company. Yet, it also provides an electronic distribution system that is highly reliable and requires a minimum amount of maintenance.

Another important feature of my electronic distribution system is that it is particularly adaptable to serve and upgrade existing telephone installations wherein a sizeable proportion of the conductors from the central office to the subscriber telephone are buried beneath the ground level. Many facilities were originally intended, when installed, to furnish what is called a "party line service" to its subscribers. That is, four to eight houses were connected to the same physical pair of conductors and only one of these was able to use the facility at the same time on a "share-time" basis. With such installations, a demand arose in recent years to upgrade this party line service to a single party service. For example, on a single cable pair originally serving four subscribers on a share-time basis it often became desirable for each of the four subscribers to have his own private line service into the central office rather than time-sharing the facility. The present invention solved this problem without disrupting the physical plant, without burying additional cable, and yet by utilizing the cable which was already in the ground; by merely connecting the components of our system at the subscriber location and at the central office location.

In general, our system for accomplishing the aforesaid objectives comprises a series of central office channel units forming a central office terminal that is adaptable for installation in a conventional telephone central office facility and subscriber station equipment for each of the channel units. The subscriber station equipment includes a "line tap unit" which is designed to receive modulated voice signals from a particular channel unit and to transmit voice signals from the subscriber back to the central office terminal where the call can be handled by conventional telephone-switching equipment.

Another object of our invention is to provide a power distribution system for an electronic distribution system wherein the power required for operating all equipment of the system such as the line tap unit located remote from the central office is relatively low and is provided only at the central office station. Because subscriber carrier systems heretofore devised were adapted largely from the trunk concept, the power consumption of these devices was generally quite high. Moreover, in these prior art systems the equipments in the field for transforming the carrier currents from the central office into a form suitable for operating the customer's telephone were operated by power derived from a tap on nearby power company wires or auxiliary power facilities. Very often the necessity for putting a piece of equipment adjacent to a power facility determined exactly where this equipment should be placed rather than technical considerations or cost considerations. This also added a per month charge to the telephone company per power drop from the power company. It also necessitated the setting of a transformer by the power company as well as a meter, and it required the telephone company to furnish at this point an emergency power system which would take over for a short term basis of from 2 to 4 hours in the event of a power failure by the power company. Since an emergency power supply had to be directed out in the field to permit continuity of service, it became necessary, economically at least, to group a number of channels of subscriber carrier field ends at one location so as to permit their use from a single power tap and a singe emergency supply. This further complication often made it necessary to engineer a miniature central office out in the field. In the present invention such line taps for power requirements are not required and the resulting complexity and complications and lack of reliability are thus eliminated.

Another object of our invention is to provide a power distribution system for an electronic distribution system wherein AC power is applied to a central station and the voltage in transmission lines extending from the central station is maintained substantially constant along its length despite losses due to the transmission line itself and the equipment required for a plurality of subscriber stations connected to the transmission line. This feature of our invention is accomplished by an arrangement for inductively loading the transmission line at predetermined intervals along its length so that an increase in voltage is created which counteracts the normally expected decreases due to line resistance itself and to losses in equipment connected to the line.

Another advantage of our power distribution system is that it protects the associated electronic equipment from damage by high magnitude, steep wave front transients that may be developed along the transmission facility such as lightning-induced surges or power faults. All electronic equipment is physically isolated from the transmission line conductors by transformers and capacitors. The transformers are designed so that they will saturate at voltages in excess of their normal operating voltages, thereby limiting the maximum voltage to associated electronic equipment.

Because of capacitor isolation at all points our system is adaptable to normal conductor testing techniques, tests for shorts, grounds and opens can be made on actual physical pairs of line conductors without recourse to special testing techniques or requiring that associated electronic equipment be disconnected.

A further important object of the present invention is to provide an automatic coordination control system for an electric wave transmission system wherein subscriber terminal equipment, regardless of its remote location from a central office station, will closely coordinate in level at a receiving point in the system with all other variously located remote subscriber terminals of the system.

In accordance with the principles of the invention, each line tap unit is a part of the subsystem called "automatic coordination control." Thus, each line tap unit for each new subscriber station of the system can be readily connected to a pair of transmission line conductors at any desired distance from the central office. In operation, each line tap unit makes its own measurements of the carrier frequency loss from the central office to it; it controls its own transmitted output signal so that it will arrive at the central office terminal or at an intermediate repeater unit at the same predetermined level as all other such line tap units; and it coordinates with other such units of the system so that interference or crosstalk is minimized and proper signal-to-noise level is maintained, regardless of its distance from the central office.

The automatic coordination control feature is important in the present system because it maintains the necessary balance for a proper operation of the system at all times and makes possible the installation of the additional subscriber stations without the necessity of highly trained personnel and the engineering of adjustment factors in each particular instance.

Other objects, advantages, and features of the present invention and a clear understanding thereof will become apparent from the following description of our system, one embodiment of which is represented schematically in the accompanying drawings wherein:

In the drawings:

FIG. 1 shows in block diagram form various interrelated units and components of an electronic distribution system embodying the principles of the present invention;

FIGS. 2–4 are diagrams for illustrating the theoretical basis for power distribution in our electronic distribution system: FIG. 2 shows a relatively short transmission line and the voltage drops along it due to resistance loads; FIG. 3 shows a transmission line having an actual length of one-quarter of a wavelength and resistance loads at intervals thereon; and FIG. 4 shows an inductively loaded transmission line having an electrical length of one-quarter wavelength;

GENERAL DESCRIPTION

Figure 1:
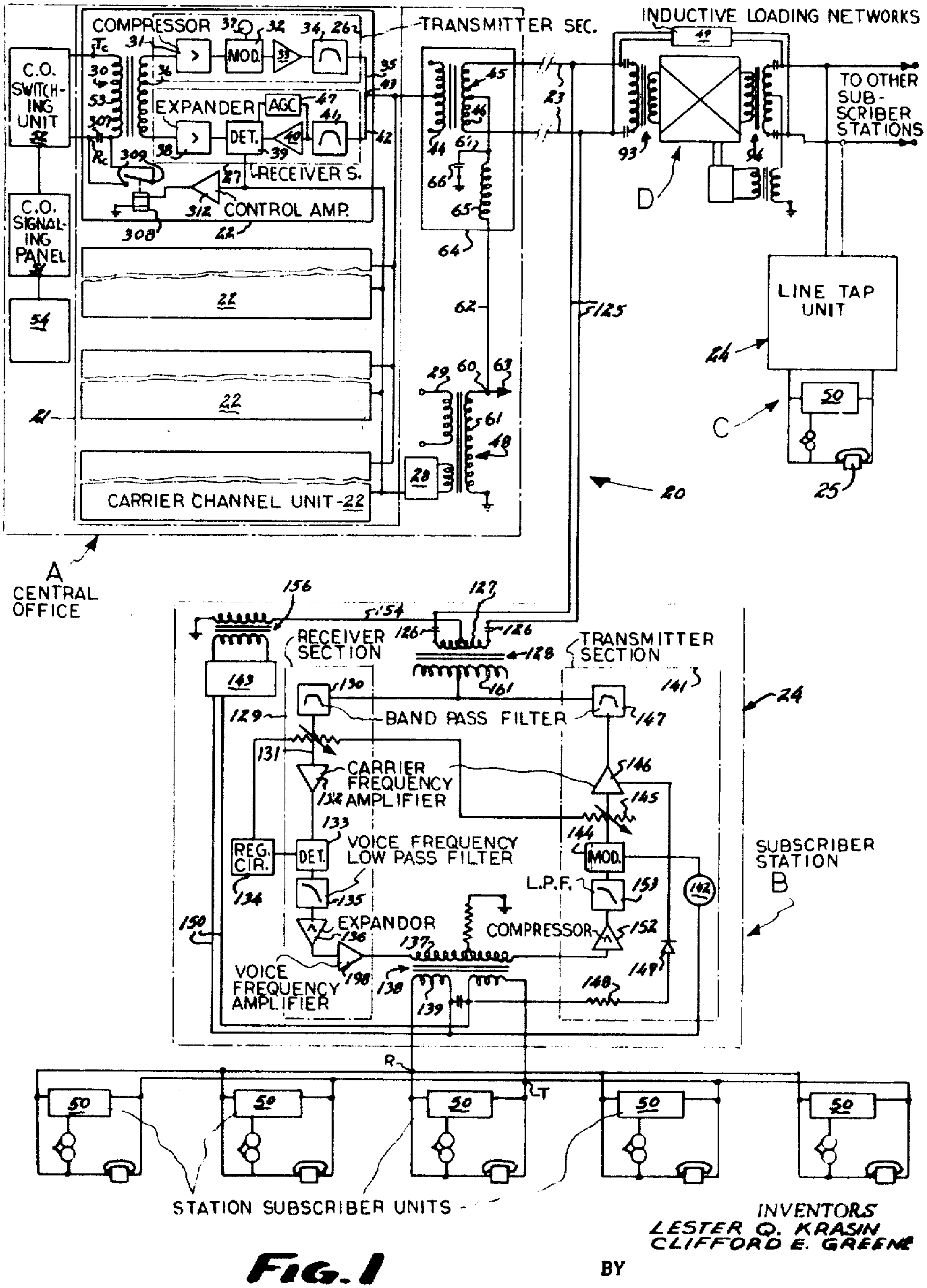

The electronic distribution system 20 represented in FIG. 1 and embodying the principles of the present invention comprises, broadly speaking, a central office terminal 21 which may be installed with other such terminals at a conventional telephone central office station A. Each terminal 21 includes a plurality of carrier channel units 22 which operate in a frequency range of 13–119 kc. and which are identical except for the frequency-determining elements that establish their channel identity. These units are connected in parallel to a pair of transmission line conductors 23 that may extend from the central office station for a distance of up to 20 or 30 miles. For each channel unit 22 there is an associated line tap unit 24 that establishes a subscriber terminal B and essentially comprises a receiving and transmitting bridge from the transmission line 23 in the field to a subscriber's telephone 25. Each line tap unit 24 receives the carrier frequency energy which is sent down the transmission line conductors 23 from a particular channel unit 22 at the central office terminal 21, and converts it to a form suitable for direct connection to a subscriber's telephone; and conversely, the line tap unit generates its own carrier-frequency energy modulation by voice-frequency energy from a connected subscriber telephone, and then transmits it back to the central office terminal.

Each line tap unit measures the loss of carrier-frequency energy received from the central office terminal and, based on this measurement, it automatically adjusts its own output to the proper value and coordinates this output with other line tap units on the line (such as indicated at "C" in FIG. 1). Thus, regardless of where a line tap unit is located along the transmission line 23 and regardless of the placement of other line tap units, all levels of signal strength in one direction of transmission will be the same and all will arrive at the central office terminal or any other receiving point at the same level. This feature of the present invention is referred to as "automatic coordination control" and, will be described in greater detail later on in this specification.

Each carrier channel unit 22 has a transmitter section 26 and a receiver section 27 to enable the unit to impose a carrier signal of a predetermined frequency on the connected transmission line 23 and to receive a carrier signal of a different frequency from a subscriber's transmitter. The channel units of any one terminal 21 are all constructed to operate at different frequency levels, and the power (e.g., 6 volts) required to operate them is supplied by a conventional regulated DC power supply unit 28 which may be connected to a suitable AC power source 29, as shown.

Both the transmitter and receiver sections 26 and 27 of each carrier channel unit 22 are connected to a hybrid transformer 30 which couples the channel units to central office switching and signaling equipment. The transmitter section 26 which can be set to a predetermined output level includes a compressor 31, a modulator 32, a carrier-frequency amplifier 33 and a band-pass filter 34, all connected in series to a load 35 extending from an end tap of the secondary winding 36 of the hybrid transformer 30. A channel oscillator 37 which provides an output at a predetermined carrier frequency is connected by a side branch lead to the modulator 32. The channel unit receiver section 27 for receiving carrier-frequency energy from the line tap units on the transmission line includes an expander 33, a signal detector 39, a carrier-frequency amplifier 40 and a band-pass filter 41, all connected in series to a lead 42 which extends from the other end tap of the secondary winding 36.

The aforesaid receiver and transmitter sections of each carrier channel unit 22 are connected to a common junction 43, and leads from the common junctions of all such units in one central office terminal connect the carrier channel units in parallel to the primary winding 44 of a coupling transformer 45. The end taps of the secondary winding 46 of the latter transformer are connected to the pair of conductors forming the transmission line 23 for the system 20.

In accordance with another feature of our invention which will be referred to later as the "power distribution system," the power necessary for operating all system equipment which is remote from the central office station A, such as the line tap unit 24, is supplied at the central office and is carried by the transmission line 23. Generally, the power distribution system comprises a power transformer 43 preferably located adjacent the central office terminal 21. This power (e.g., 110 to 130 volts, 60 cycle AC) is supplied by a center tap to the secondary winding 46 of the coupling transformer 45 and thus is fed into the transmission line 23. As will be seen by the detailed description of the power distribution system, the voltage along the transmission line 23 from the central office terminal is maintained substantially constant despite line and equipment losses by means of inductive loading networks 49 placed at intervals along its length.

To counteract the normal attenuation of the signals transmitted from the central office terminal along the transmission line, one or more line amplifier or repeater units D are provided in the system which are coupled in series to the transmission line 23 at spaced-apart intervals which are predetermined on the basis of a certain amount of signal loss. For example, over a typical system having a cable length of about 23 miles of 19-gauge cable (0.083), such units may be spaced apart on the transmission line at a distance equivalent to from 30 to 40 db. without adversely affecting system performance (e.g., a nominal repeater spacing at 116 kc. would be 35 db.)

Like the line tap units 24, the line amplifier units D are powered by the central power system from the central office terminal. These line amplifier units provide both automatic slope control to compensate for frequency variations as well as automatic gain control to compensate for the normal attenuation of signal strength along the transmission line.

As stated, each line tap unit 24 is controlled by one of the carrier channel units 22 operating at a specified carrier frequency in the central office terminal 21. Yet, as shown in FIG. 1, each line tap unit may provide multiparty service for up to five subscribers, and therefore, a subscriber signaling unit 50 is connected to a line tap unit for each subscriber of such a multiparty group. Our invention provides a signaling system which makes it possible for each subscriber signaling unit 50 to be activated by a distinctive marker tone to which it is tuned, which tone is produced by a marker-tone generator located within a central office signaling panel 51 at the central office station. In the block presentation of FIG. 1 the latter is connected to a conventional telephone system central office switching unit 52 which in turn is connected to the primary winding 53 of the hybrid transformer 30. The signaling panel 51 is also connected to a conventional central office ringing supply or equivalent apparatus represented by the block numbered 54. The marker tone produced is superimposed on the output of a conventional central office ringing generator that goes through the signaling panel 51, and then is transmitted as modulation of the carrier current from the central office to the appropriate line tap unit 24. A different subscriber signaling unit 50 is provided for each subscriber phone connected to the same line tap unit, the difference between each subscriber unit being the marker-tone frequency to which it is tuned. Thus, if more than one subscriber is connected to one line tap unit and if each has a subscriber signaling unit tuned to a different frequency, it is possible to ring only one subscriber's phone at a time by applying the proper marker tone at the switching panel in the central office.

THE POWER DISTRIBUTION SYSTEM

The power distribution system, according to the present invention, provides a means for operating all of the system equipment located remote from the central office station in the electronic distribution system 20 by power applied to the transmission line 23 at the central office station. As shown in FIG. 1, power from the source 29 is applied to the power transformer 48 which serves to isolate the transmission line 23 from the power source and to increase the voltage as required. The end tap 60 on the secondary winding 61 of the power transformer is connected to a lead 62 which is center tap connected to the secondary winding 46 of the coupling transformer 45. An arrow 63 extending from the end tap 60 indicates a power lead which may be applied to other central office terminals in the system 20. The winding 46 serves as part of a coupling network 64 that interconnects the transmission line and the central office terminal and includes an inductor 65 in the lead 62 and a capacitor 66 in a branch lead 67 to ground, which is located between the inductor 65 and the coupling transformer 45. The coupling network is a means for inductively loading the transmission line 23 so that its electrical length is effectively increased.

Normally, power applied to a transmission line will be attenuated along its length due to a combination of inductance, resistance and capacitance, so that the voltage appearing at the end of the line will be significantly less than the voltage applied to the transmission line at its source or the central office. In the present invention, our power distribution system overcomes this problem and provides a means for maintaining substantially constant voltage along the entire distribution system despite the normal line losses and the losses due to the operation of equipment connected to the line at intervals along it. In effect, this is accomplished by inductively loading the transmission line, preferably in its simplex mode, and not only by means of the coupling network 64 but by the inductive loading elements 49 located at other predetermined spaced-apart intervals along the line 23.

Figure 2:
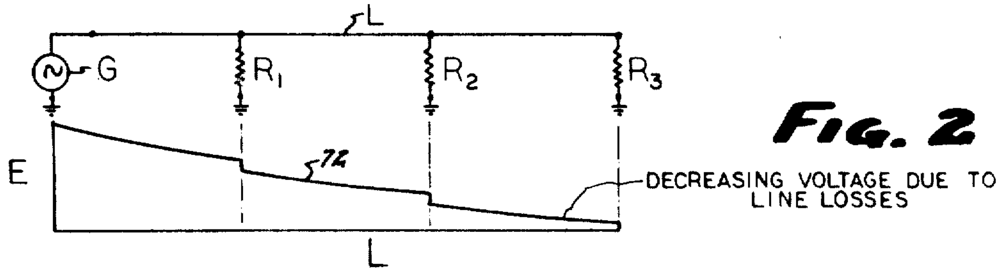
Figure 3:
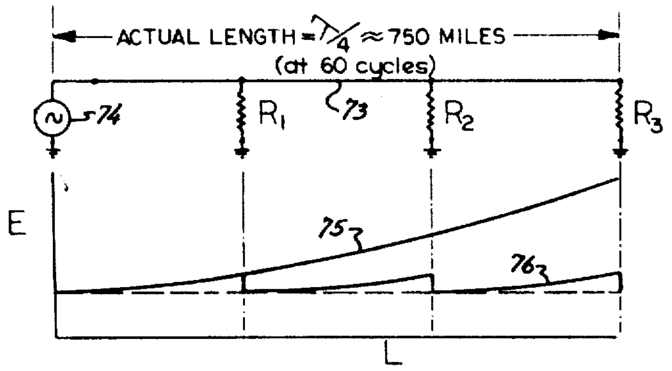
Figure 4:
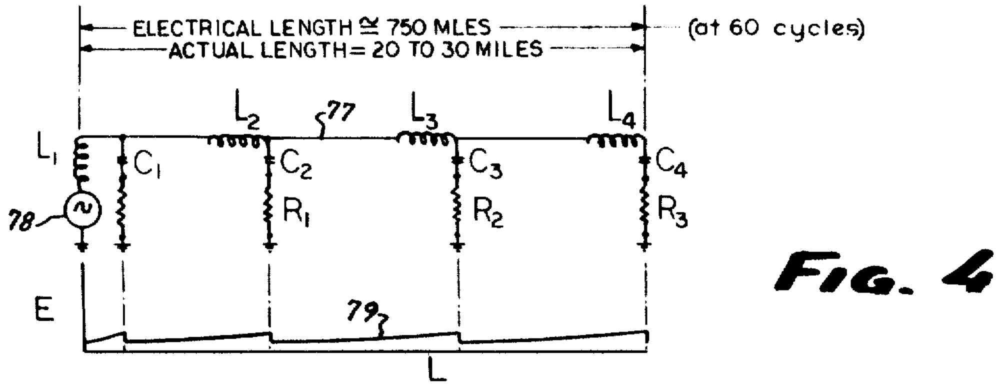

The explanation of the inductive loading method for controlling the power in the two-conductor transmission line 23 may be made by reference to FIGS. 2 to 4. In FIG. 2 a simple electrically short power system is shown diagrammatically wherein power from a source 70 is applied to a line 71 having a resistance "R" per foot and having various connected loads $R_1$, $R_2$ and $R_3$ along its length. Here, as shown in a typical plot 72 of voltage vs. the line length, the voltage will decrease from the source to the end of the line due to the resistive loads $R_1$, $R_2$ and $R_3$ and the distributed line resistance.

In FIG. 3 a system is shown wherein a transmission line 73 supplied with AC power from a source 74 whose actual length approaches one-quarter of a wavelength at the power source frequency (e.g., 60 cycles). Here, since the sine wave of the voltage starts at the AC source, the voltage (with no resistances on the line) will constantly rise along a line of this length. This voltage rise, as shown in the associated plot 75 of voltage vs. line length, is limited only by the source impedance, the distributed resistance of the line conductor, and the dissipation between the conductor and ground. Now, if the loads $R_1$, $R_2$ and $R_3$ are placed on the line and if they are of the proper magnitude and are properly spaced, their loss values could be adjusted to compensate for the aforesaid voltage rise and the resulting voltage along the line 73, as indicated by the dotted line 76, would then be substantially constant at all points along its length.

In an electrically short-power distribution system, as shown schematically in FIG. 4, it is possible to extend a transmission line 77 supplied by AC power from a source 78 to an effective one-quarter wavelength (e.g., 750 mi. at 60 cycles AC) by distributing increments of inductance $L_1$, $L_2$, $L_3$ and $L_4$ in series on the line and elements of capacity $C_1$, $C_2$, $C_3$ and $C_4$ in parallel and at intervals along the line. This provides the same voltage rise effect as if the transmission line were actually one-quarter-wavelength long at the power frequency. Thus, when the proper inductive loading is applied at intervals it essentially cancels the effects of the line losses contributed by loads such as $R_1$, $R_2$ and $R_3$. If the loads are of the proper magnitude the line voltage as indicated by the plot 79 will be substantially constant along the entire transmission line L, and this is the result achieved by the power distribution system of the present invention.

In the system 20, the inductive loading of the transmission line 23 is accomplished by the coupling network 64 located at the central office terminal, as previously described, and by a series of line-loading networks 49 at each of the line amplifier units D. In its broader aspects, the basic components and operation of our power distribution system may best be described and more easily understood with reference to the schematic diagram of FIG. 5. Here, the block 80 represents an information signal generator such as the central office terminal 21 which provides the information to be transmitted over a pair of conductors **23*a*. This information could represent a single band of frequencies such as a single voice-frequency, F-1, circuit, or a multiplicity of information such as carrier frequencies for voice or data circuits. The component 81 represents an AC power source operating at a frequency, F-2, (e.g., 60 cycles) which is lower than the lowest information-frequency (F-1) and having sufficient capacity to power all of the associated electronic equipment which is located along the conductors 23*a***.

The power source 81 is coupled through a power transformer 82 whose secondary winding 83 is connected to a ground 84 at one end tap and to a lead 85 at its other end tap 86. The latter lead is connected to a balanced center tap 87 of the secondary winding 88 of an information coupling transformer 89 which interconnects the transmission line conductors **23*a* to the information generator 80. The conductors 23*a* extend to operating equipment designated by the block 92 which may be placed on the line at some location remote from the power source 81 and the information generator 80**.

This intermediate equipment 92, which would primarily be for signal amplifying, is placed in series on the line conductors 23a. However, it is isolated from the power carried by these conductors by means of a pair of coupling transformers 93 and 94. Thus, the conductors 23a are connected to the transformer 93 on one side of the equipment 92 and to the transformer 94 on the other side of the equipment. A pair of power carrying leads 95 and 96 are connected to the conductors 23a and shunt the low frequency power around the equipment 92 and both transformers 93 and 94.

Connected in series in the shunt leads 95 and 96 are two bifilar wound iron core inductors 97 and 98 which provide an increment of inductive loading to the transmission line, in the manner previously described. Therefore, the voltage appearing at the output terminals of the inductor 98 will be considerably higher than the voltage appearing at the input terminals of the inductor 97. A capacitor 99 connected across the leads 95 and 96 between the inductors 97 and 98 forms the shunt leg of a low-pass filter network formed by the bifilar windings of the inductors 97 and 98. This latter filter serves to reject any frequency higher than the power frequency F–2, thereby providing isolation between the input and the output of the intermediate electronic equipment 92 at all information frequencies, F–1. Yet, as just described, the power frequency, F–2, is passed around the intermediate equipment with the aforesaid inductive voltage step-up.

In the conductors 23a connected to the primary winding 100 of the first coupling transformer 93 are a pair of capacitors 101 and 102, respectively. Similarly, a pair of capacitors 103 and 104 are provided in the line conductors connected to the primary winding 105 of the second coupling transformer 94. At the second coupling transformer 94, power is accepted from a center tap 106 on the primary winding 105 through a lead 107 to one end tap 108 of the primary winding 109 of a power transformer 110. The other end tap of the winding 109 is connected to an earth ground 111. The secondary winding 112 of the power transformer is connected to a regulated power supply 113 that furnishes power to the equipment 92.

Figure 5:
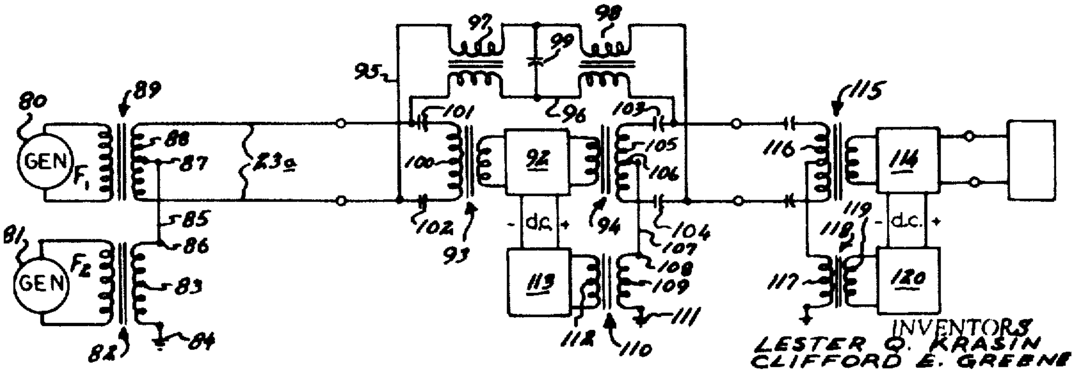
FIG. 5 is a block diagram showing one arrangement for power distribution in an electronic distribution system according to the invention.

In the simplex feed arrangement for our power distribution system which is shown in FIG. 5, the line conductors 23a act like an ordinary split conductor. The winding 105 of the coupling transformer 94 is balanced with the winding 109 of the power transformer 110 and is broadly resonant at the power frequency, F–2, with the parallel capacity of the capacitors 103 and 104. Thus, the flow of current is from the secondary winding 83 of the transformer 82, the conductors 23a, the shunt leads 95 and 96, the primary windings 105 and 109 and the earth ground connections 84 and 111.

With respect to the information signals being transmitted by the conductors 23a, the primary winding 100 of the transformer 93 combined with the capacitors 101 and 102 and the primary winding 109 combined with the capacitors 103 and 104 act to form high pass filters. In each case the series capacity of the associated capacitors acting with the inductance of the adjacent transformer winding, are resonant at a frequency lower than the minimum information frequency, F–1, but higher than the power frequency, F–2. These filter combinations thus pass all information frequencies, F–1, but reject any vestigial unbalance voltages that may appear across the conductors 23a at the power frequency, F–2.

Further down the line from the equipment 92 other equipment such as a line amplifier or repeater unit or end equipment as indicated by the block 114, may be connected to the conductors. This end equipment which could be a line tap unit is coupled by means of another transformer 115 in generally the same manner as just described. A center tap from the primary 116 of this latter transformer is connected to the primary winding 117 of a power transformer 118 whose secondary winding 119 is connected to a DC power supply 120 for the end equipment.

Thus, as seen in FIG. 5, the inductive loading can be supplied wherever necessary to maintain the power voltage substantially constant along the transmission line, and this enables additional intermediate equipment to be connected to the transmission line wherever it is needed to provide the required subscriber facilities. At the same time, the line equipment can be isolated from and its information transmission not affected by the low frequency power.

Instead of the simplex feed system shown in FIG. 5 and in FIG. 1, the power distribution system could be connnected in a parallel arrangement which, to conserve space, is not shown herein.

THE LINE TAP UNIT

As shown in block diagram from in FIG. 1, each line tap unit 24 is connected by a pair of branch leads 125 to the main transmission conductor pair 23 through which carrier-frequency energy is transmitted from the central office terminal 21. When received, this energy is capacitively coupled by a capacitor 126 in each conductor to the primary winding 127 of a carrier-frequency coupling transformer 128. In a receiver section 129 of the line tap unit a band-pass filter 130 selects only that energy which is transmitted by its associated central office channel unit. This received energy is attenuated in a variolosser circuit 131 by an amount which is determined by the strength of the incoming signal and then is fed to a carrier-frequency amplifier 132. In a detector 133, connected to the output of the amplifier 132, one component of the detected signal is applied to a regulation circuit 134 which controls the attenuation of the variolosser 131. The other component of the incoming detected signal is applied to a voice-frequency low-pass filter 135 which integrates the voice-frequency energy contained in the voice frequency modulated carrier-frequency energy. This suppresses the carrier-frequency energy and applies the derived voice frequency to an expander 136 where it is amplified, expanded, and then applied through a voice-frequency amplifier 198 to the received winding 137 of a differential hybrid transformer 138. Here and "-signal energy is coupled to the primary winding 139 of the differential hybrid transformer from whence it flows to the output terminals T and R of the line tap unit 24. Depending on the status of the telephone call, the derived voice-frequency energy at the T and R terminals will either actuate a subscriber-signaling unit 50 thereby ringing a telephone bell 140, or it will be the received component of a two-way voice conversation being carried on via a telephone 25.

In the transmitter section 141 of the line tap unit 24 a channel oscillator 142 connected to a line tap unit power supply 143 serves as a source of carrier-frequency energy at some predetermined carrier frequency. It is coupled through a modulator 144 to a controlled attenuator or variolosser 145, to a carrier-frequency amplifier 146 and thence through a band-pass filter 147. The latter removes any harmonics and capacitively couples the carrier-frequency energy through the carrier-frequency coupling transformer 128 and the capacitors 126 to the branch conductors 125, and thence through the transmission line 23 to the associated central office channel unit 22.

In its initial state (telephone "on hook") the carrier frequency amplifier 146 of the line tap unit transmitter is inactive. When the telephone is put in an "off hook" condition, it presents a resistance circuit to the terminals T and R of the line tap unit, and current flows through the winding 139 of the differential hybrid transformer 138, a resistor 148, and a diode 149, and turns on the carrier-frequency amplifier 146. This passes the carrier-frequency energy through the variolosser 145, previously described. Actuation of the dial portion of a telephone acts to present alternate "open circuit" and resistance circuit conditions to the terminals T and R in accordance with the digital information dialed. This alternately causes the carrier-frequency energy to be turned on and off in accordance with the digital information, thus providing a method of transmission of dial pulse information to the central office terminal.

The voice-frequency energy coupled into the transmitter of the telephone set acts to modulate a "talking battery" voltage which is derived from the DC power supply 143 of the line tap unit and is fed by a pair of leads 150 through the primary winding 139 of the differential hybrid transformer 138 and thence through the terminals T and R to the telephone. This voice frequency is coupled to the "transmit" section of the primary winding 137 of the differential hybrid transformer 138 and thence to a compressor 152 where it is amplified and the volume range dynamically compressed. The compressed voice-frequency energy is fed through a low-pass filter 153 to the modulator 144 where it is impressed on the carrier-frequency energy derived from the channel oscillator 142 in such a manner that the amplitude of the carrier frequency energy is varied in accordance with the impressed voice-frequency energy.

In order to describe the line tap unit 24 and additional features thereof in greater detail, reference will now be made to FIG. 6. From a center tap on the primary winding 127 of the coupling transformer 128, a lead 154 extends to one end tap of a primary winding 155 of a power transformer 156. The other end of this winding is connected to an earth ground 157 which provides a low impedance return circuit to the central office. The reduced voltage appearing across the secondary winding 158 of the transformer 156 is applied to the conventional power supply unit 143 where it is rectified to DC and divided into two branches, namely regulated "electronic battery," (6 volts DC) at the leads 159 and "talking battery" (10 volts DC) at the leads 150.

At the coupling transformer 128, the capacitance values of the capacitors 126 and the inductance of its primary winding 127 act to form an effective high pass filter section. This filter will couple carrier-frequency voltage appearing across a pair of line tap unit input terminals 160 into the secondary winding 161 of the transformer 128, but will tend to reject lower frequencies (e.g., voice frequencies and power frequencies). This carrier-frequency voltage developed across the secondary winding of the transformer 128 is coupled through a pair of leads 162 and 163 to the receiver band-pass filter 130. The latter passes only the carrier frequency and sideband components of the associated central office channel unit, rejecting all other frequencies.

The channel-frequency energy at the output of the band-pass filter 130 flows through a lead 164 to a resistor 165 and a pair of DC blocking capacitors 166 and 167 which are part of a network comprising the variolosser 131. From this latter network the energy is passed through the carrier-frequency amplifier 132 where it is stepped up to a higher level before being applied to the detector 133. The detected signal is divided into two voltage components one of which is connected through a lead 170 to the regulator circuit 134. This latter voltage is applied as a base-bias voltage for a transistor 171 through a resistor 172 and across a capacitor 173. Associated with the transistor 171 is a conventional "reference voltage circuit" represented by the block 174. It is in series with the capacitor 173 in a lead 175 which is connected to the lead 170. This reference voltage circuit is connected to and applies a very closely controlled voltage to the emitter 176 of the transistor 171. So long as the developed base-bias voltage of the transistor 171 remains lower than its emitter voltage, it remains in a nonconducting condition. However, when the base-bias voltage exceeds the emitter voltage, the transistor 171 will conduct current through its collector connection 177, and the greater the base-bias voltage, the more current will be conducted. This current flows through a lead 178 in which are four diodes 179, 180, 181 and 182 connected in series and which terminates at a common negative bus point 183. The purpose of the diode 179 is to provide isolation for the incoming signal from the filter 130 and the DC control signal from the regulator circuit 134. The diode 180 forms the current-controllable shunt arm of the variolosser circuit 131 which also includes the series resistor 165, the diode 179, and a bypass capacitor 184. The components of the variolosser 131 in combination with the regulator circuit 134 and the DC blocking capacitors 166 and 167, together provide an automatic gain-control circuit 168 for the receiver section of the line tap unit. When a signal is received by a line tap unit an increase in current through the diode 180 tends to lower its shunt impedance to a common point 185 through the bypass capacitor 184, thereby reducing the carrier-frequency energy applied to the carrier-frequency amplifier 132 and therefore reducing the output of the detector 133. In effect, any increase in the carrier-frequency energy appearing at the input of the automatic gain-control circuit 168 will be so attenuated by this circuit that it will maintain a constant output at the detector 133 within very close limits.

The voice-frequency energy recovered by the detector 133 is coupled through a lead 186 to the input of the low-pass filter 135 which strips any remaining carrier-frequency energy as well as suppressing harmonic content, and the output of this low-pass filter is applied through a lead 187 to the input of the expandor 136. The expandor 136 serves to expand the range of the voice-frequency volume levels (which were originally compressed in the central office terminal) back to their full original range. Basically, it includes a DC control amplifier 188 and a controllable voice-frequency amplifier comprised of an amplifier transistor 189 and its associated components, which function together as follows. Voice-frequency energy from the lead 187 is applied to the DC control amplifier 188 and also through a capacitor 190 to the base of the amplifying transistor 189. A pair of resistors 191 and 192 act to provide an operating base-bias voltage to the transistor 189. Amplified voice-frequency energy is developed across a collector load resistor 193. The emitter voltage of the transistor 189 is developed by the voltage drop across a resistor 194. The gain of the transistor 189 is controlled by the relative voice-frequency bypassing impedance of a capacitor 195 acting with the series impedance of a diode 196. The series impedance of the diode 196 is directly controlled by the DC control current which is developed by the DC control amplifier 188, and is therefore responsive to the voice-frequency energy input. The combination works in such a manner that past a certain predetermined low threshold level, a 1 db. increase in input level will result in an approximate 2 db. increase in output level. The expandors 38 in each central office channel unit 22 all operate in a like manner.

The expanded voice-frequency energy output flows through a lead 197 to the input of a voice-frequency amplifier 198 and thence through a lead 199 to the primary winding 137 of the differential hybrid transformer 138. It is thus electromagnetically coupled to the secondary winding 139 of the transformer 138 and appears across the output terminals T and R.

Presuming a telephone instrument connected to the terminals T and R of the line tap unit 24, the "talking battery" voltage which is derived through the leads 150 from the power unit 143 is connected at points 200 and 201 of the transformer 138. This DC voltage is modulated in accordance with the speech being impressed on the transmitter of the telephone instrument and is electromagnetically coupled to the winding 137 of the transformer 138 and thence through a lead 202 to the input of the compressor 152.

The compressor 152 acts to reduce the power range of input levels by approximately 2:1 in the following manner. A resistor 203 in conjunction with the diode 204 acts to form a variable attenuator whose attenuation is a function of the variable shunt impedance of the diode 204. This diode impedance is a function of the amount of the DC current being impressed on it by a DC control amplifier 205 responsive to the signal level at its input. This input level is derived through a lead 206 from a voice-frequency amplifier 207 which amplifies the voice-frequency energy capacitively coupled through the variable pad or attenuator circuit by a pair of capacitors 208 and 209. A high-level signal appearing on the input lead 202 to the compressor will be attenuated more than one at a lower level, thereby compressing the relative range of the volume levels appearing at the output of the compressor 152. The compressor 31 of a central office channel unit 22 operates in a like manner, as just described.

The voice-frequency energy from the compressor 152 is applied through a lead 210 to the input of the low-pass filter 153, the output of which feeds a modulator 144. This low-pass filter removes any higher order harmonics of the voice-frequency energy. The modulator 144 is also connected to the channel frequency oscillator 142 which provides a source of carrier frequency energy at a predetermined frequency. The modulator 144 acts to impress voice-frequency energy (e.g. amplitude modulation). This modulated carrier-frequency energy from the output of the modulator 144 is fed through the variolosser 145 to the input of the carrier-frequency amplifier 146 where it is amplified and connected to the input of the band-pass filter 147 which removes any carrier-frequency harmonic content and whose output is connected through leads 213 and 214 to the winding 161 of the transformer 128. Thus, this carrier-frequency energy is electromagnetically coupled to the primary 127 of the transformer 128 and capacitively coupled through the capacitors 126 through the terminals 160 to the transmission line 23, and thence to the associated central office channel unit.

If a resistance circuit such as presented by a telephone instrument appears at the points 200 and 201 a positive voltage will occur in the lead 216 through the resistor 148. This voltage causes the diode switch 149 to be opened, and it enables the carrier-frequency amplifier 146 to perform its previously stated amplification function. An open-circuit condition at the points 200 and 201 will remove the positive potential closing the diode switch 149 and disabling the carrier-frequency amplifier 146. Actuation of the dial of the telephone instrument will result in a series of open and resistance circuit conditions to occur in accordance with dial digital information. Due to the aforementioned action of the diode switch 149 this will result in the transmission of on-off pulses of carrier-frequency energy in accordance with the dialed information.

THE AUTOMATIC COORDINATION CONTROL SYSTEM

In the electronic distribution system 20 according to the present invention a plurality of line tap units, that is, one for each channel unit 22 of a central office terminal, are connected to a single transmission pair of conductors. Moreover, in a typical installation of our system a transmission facility may contain a plurality of pairs of conductors, one for each of several central office terminals at the central office exchange. These factors both contribute to the problem of coordination control. When two or more line tap units 24 are within the range of a line amplifier unit D, the signals from each line tap unit, if uncontrolled, would arrive at the line amplifier unit at different levels and must be equalized. Also, when conductor pairs are located in close proximity of each other such as in a cable bundle, mutual interference occurs between systems on circuits operating at the same frequencies, i.e., near end and far end crosstalk; and this must be minimized in order to provide adequate system performance.

The system of the present invention overcomes these coordination problems by automatically controlling the transmit power in the electric wave transmission system in such a manner that regardless of the location of a remotely located terminal on a transmission facility, it will closely coordinate in level at a receiving point in the system with all other variously located remote terminals of the system, and in such a way that it minimizes mutual interference between adjacent conductor pairs.

Figures 7, 8:
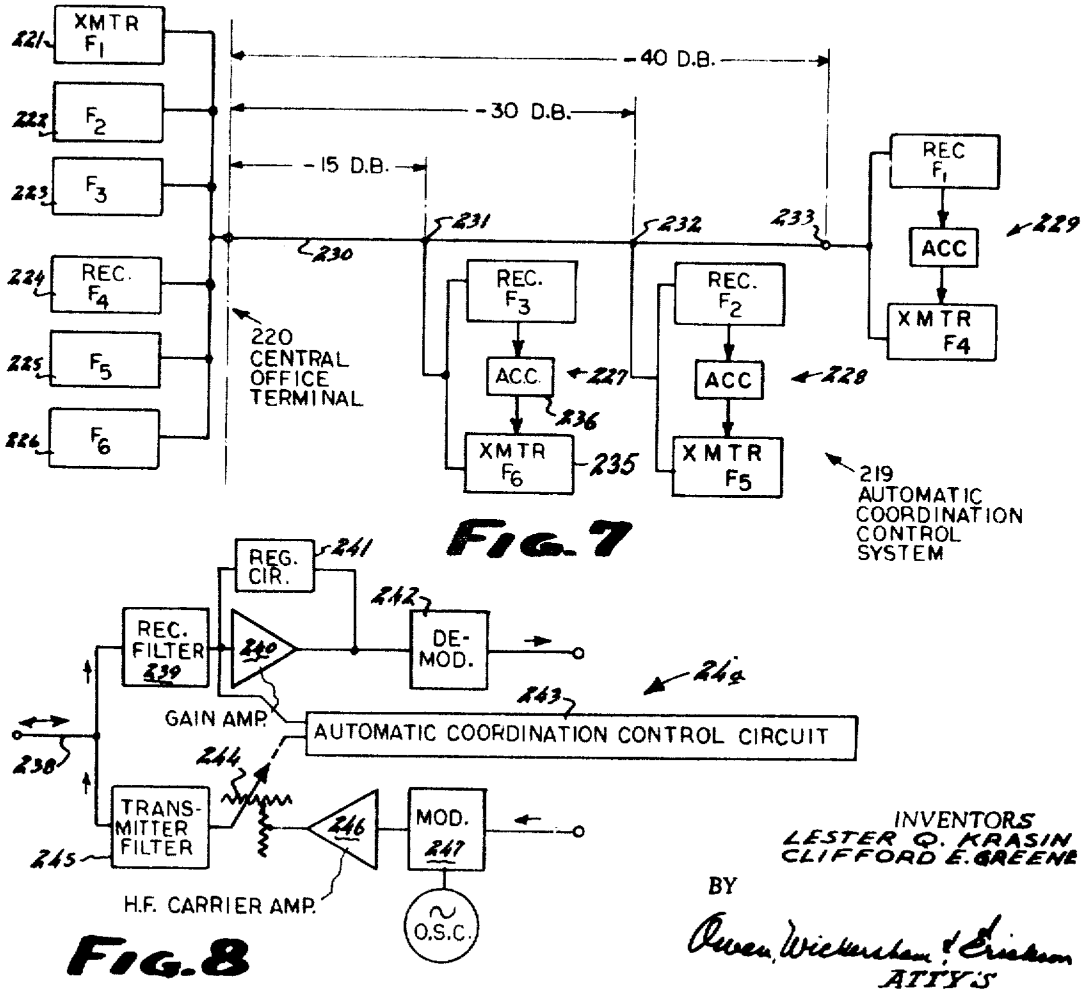
FIG. 7 is a diagram illustrating the principle of operation of the automatic coordination control portion of our electronic distribution system.

In FIG. 7 a diagram illustrating the theory of operation of our automatic coordination control system 219 shows a central office terminal 220 consisting of three channel units 221, 222 and 223 transmitting in one direction on frequencies F-1, F-2 and F-3, respectively, and three units 224, 225 and 226 receiving in the other direction on frequencies F-4, F-5, and F-6. Remote terminals or line tap units 227, 228 and 229 are located along the transmission facility 230 at points 231, 232 and 233 representing 15 db. 30 db. and 40 db. of loss. Each terminal or line tap unit has a receiver component 234 and a transmitter component 235 which are tuned to a frequency matching one transmitter and one receiver of the central office terminal. Each line tap unit also includes an interconnected automatic coordination control component 236 which will be described in detail later. Arbitrary nominal levels have been established as 0-dbm transmit and −40-dbm receiving on the transmission facility which has a 40-db. loss. As can be seen, the remote terminal 229 and the central office receiver terminals 224, 225 and 226 are transmitting and receiving at the same level, so no adjustment in output signal is required here. At the remote terminal 228 the automatic coordination control circuit 236 senses that the received level is 10 db. from a nominal reference level that is preset within the coordination control component 236 of the terminal, and consequently it reduces its transmit level by 10 db. Similarly, at the remote terminal 227 a receive to reference increase of +25 db. is detected, so this terminal automatically decreases its transmit level by a like amount.

Thus, in accordance with this coordination phase of our invention, despite the addition of transmit levels and associated losses on the transmission facility and regardless of the placement of the remote terminals or line tap units, all levels of signal strength in one direction of transmission will be identical at any point along the transmission facility and all will arrive at the receiving point at the same level. This feature makes it possible to connect a remote terminal or a line tap unit 24 to a transmission facility at any point from the central office terminal 21 or from a repeater unit D without requiring any adjustment of the transmit power.

The functional block diagram of FIG. 8 represents a portion of a remote terminal 24*a* which is shown to illustrate how the automatic coordination control is accomplished. The desired signal from the high frequency line 238 is selected by a receive filter 239 and is amplified by a highly stable HF fixed gain amplifier 240 providing gain G. In parallel with the amplifier 240 is a feedback or regulator circuit 241, which is equivalent to the block 134 in FIG. 6. Thus, the output of the amplifier 240 controlled by the feedback circuit 241, which may be represented by $E_{in}$—G, is fed to a demodulator 242 and also through the regulator circuit 241 to an automatic coordination control circuit 243. Any change in the $E_{in}$ will be accurately reproduced at the input to the automatic coordination control circuit 243. Hence, the output of the automatic coordination control circuit will be a function of $E_{in}$. The particular function at the output of the automatic coordination control circuit would depend on the circuitry of a controllable attenuator 244 which is connected in the unit's transmitter section between its transmitter filter 245 and its HF carrier amplifier 246 connected to a transmitter modulator 247. The components 243 and 244 in FIG. 8 in combination include the elements of the circuit 145 in FIG. 6. In essence, the automatic coordination control circuit 243 compares the received signal to the amplifier 240 against a fixed reference and produces an output which, when applied to the controllable attenuator 244 will adjust the transmit level in the transmit amplifier 246 to a predetermined level based on the deviation of the received signal from reference.

Figure 6:
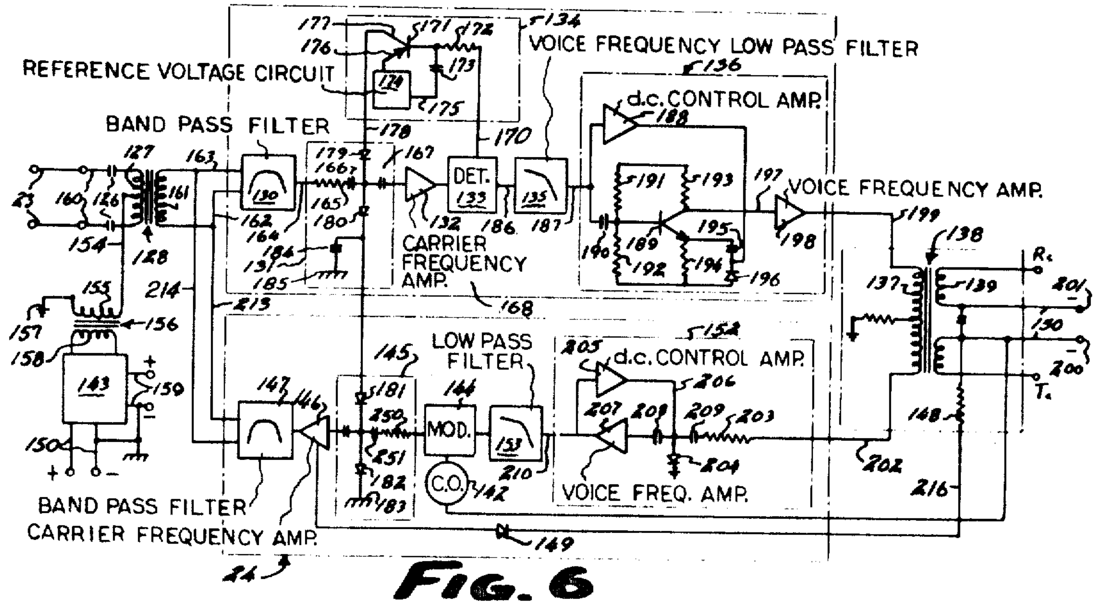
FIG. 6 is a detailed block diagram of a line tap unit embodying the principles of the invention.

In FIG. 6 the automatic coordination control circuit for the line tap unit 24 includes elements of both variolosser 131 and 145 and may be described in the following manner. A resistor 250 in series with a capacitor 251 forms a series arm and the diode 182 connected to the negative bus point 183 forms the shunt arm of the adjustable attenuator in the variolosser circuit designated by numeral 145 in FIG. 1. The amount of attenuation in this circuit is dependent upon the impedance of the shunt diode 182 which is controlled by the direct-current flow in the diode string in lead 178. As previously described, this current is a direct function of the output of the regulator or feedback circuit 134, which in turn is a direct function of the level of the received carrier-frequency energy, acting in such a manner as to increase current with increased signal level relative to the fixed reference level and to reduce current with reduced signal level. An increase of current causes the diode 182 to have a lower impedance and therefore causes an increase in attenuation through the automatic coordination control circuit. In effect, the, the output level of the modulated carrier-frequency energy of the line tap unit 24 is controlled by its input level and the higher the input level the lower the output level at the terminals 160.

OPERATION OF THE SYSTEM

To complete the description of our system 20, its operation in various modes will now be reviewed with reference to FIG. 1. To originate a call from a subscriber the hand set of the telephone 25 at the subscriber location which is illustrated as connected to the terminals T and R of the line tap unit 24 is placed in an "off hook" condition. This condition presents a resistance circuit to terminals T and R which, acting through the differential hybrid transformer primary winding 139, will cause a flow of current through the resistor 148 and the diode 149 to the carrier-frequency amplifier 146. This allows carrier-frequency energy generated by the channel oscillator 142 and fed through the modulator 144 and the automatic coordination control circuit 212 to be applied through the carrier-frequency amplifier 146, the band-pass filter 147, and through the carrier-frequency coupling transformer 128 to the pair of conductors 23. At the central office terminal the carrier-frequency energy passes through the coupling transformer 45 and is selected by a band-pass filter 41 in the channel unit receiver 27 where it is amplified by a carrier-frequency amplifier 40 and detected by the detector 39. The signaling connection of the detector 39 takes the detected signal through the control amplifier 312 which in turn actuates the relay 308 and causes the contacts 309 to close the circuit for the small capacitor 307. This presents a resistance circuit to the central office switching equipment 52 which causes a linefinder switch to be seized and a dial tone to be placed across the conductor pair from the conventional central office switching equipment. The dial tone derived from the switching equipment is fed through the differential hybrid transformer 30 to the compressor 31 of the transmitter 26 and is impressed at the modulator 32 on the carrier-frequency energy generated by the channel oscillator 37. This signal in turn is amplified by the carrier-frequency amplifier 33 and fed through the band-pass filter 34 to the carrier-frequency coupling transformer 45 which couples it into the conductors 23. As this signal energy travels along the conductors it is intercepted by the carrier-frequency coupling transformer 128 of the line tap unit 24 selected by the band-pass filter 130 of its receiver 129. It passes through the automatic gain-control circuit and is amplified by a carrier-frequency amplifier 132, and detected by the detector 133. Any carrier-frequency energy still in existence and any possible harmonic content is wiped out by the voice-frequency low-pass filter 135 before the signal enters the expander circuit 136 which expands it back to its original range of volume levels. The expanded signal is then fed into the differential hybrid transformer 138 where it is coupled to the winding 139 connected to terminals T and R of the line tap unit and is thus received as a voice-frequency signal in the receiver of the telephone unit 25. Having received a dial tone indicating that the central office switching equipment has been seized, the party will commence dialing. The dialing actuation in a telephone causes alternate open-circuit conditions and resistant-circuit conditions to occur in accordance with the dial digital information. This, in turn, effectively causes the carrier-frequency energy being transmitted from the line tap unit to be turned on and off in accordance with the dialed information. At the central office channel unit receiver this information is detected by the detector 39 and is used to actuate the control amplifier 312 and its associated relay 308 which in turn causes a duplicate open-circuit and resistant-circuit series of pulses to be presented to the central office switching equipment by the contacts 309 of the relay which is controlled by the DC amplifier. In the central office switching equipment 52 the series of dial pulses will cause the call to progress through the central office and to other central offices if required to complete a connection to the desired subscriber, and the desired subscriber will receive a ringing signal at his telephone. When he comes "off hook" or answers the telephone, a communication path will be established between the calling subscriber at the line tap unit and the desired subscriber who has been called, with the transmitted information from the called subscriber being transmitted in the same manner as the dial tone information which was previously described. The conversation from the calling subscriber will be effected in this manner. The "talking battery," which is the DC voltage present at the center tap connection of the winding of the differential hybrid transformer 138, is modulated by the conversation of the calling subscriber. This modulation is electromagnetically coupled to the received winding 137 of the differential hybrid transformer and then is applied through the compressor 152 through the filter 153 and to the modulator 144 where it is impressed on the carrier-frequency energy produced by the channel oscillator 142. From the modulator, it is passed through the automatic coordination control circuit and then is amplified by the carrier-frequency amplifier 146. The output from the latter is fed through the band-pass filter 147 to eliminate all harmonic content and then is coupled to the transmission pair of conductors 23 by way of the carrier-frequency coupling transformer 128. At the central office unit where it is received as previously described, the voice-frequency information is applied through the expander 38 and thence to the receive winding 36 of the differential hybrid transformer 30 where it is electromagnetically coupled into the secondary winding thereof and thence to the central office switching equipment which has established the calling route to the called party. To terminate this call the calling party places his telephone in an "on hook" condition which, because of the open-circuit condition of the line tap unit causes the carrier-frequency amplifier to be turned off, thereby eliminating the carrier-frequency energy from this unit to the central office equipment. This "on hook" condition is also detected as a supervision signal at the detector 39 of the channel unit and opens the contacts 309 of the supervision relay 308 associated with the DC control amplifier 312 thus presenting an open circuit condition to the central office switching equipment 52 which in turn drops the entire switch train terminating the call.

Establishing a call from a calling party external to the central office station A to a called party connected to another subscriber on the line 23 would proceed as follows. The calling party would dial the called party. Upon completion of dialing the central office switching equipment would apply a ringing signal to the terminals associated with the differential hybrid transformer 30. In the central office ringing supply a marker tone is inserted in a manner previously discussed. The small capacitor 307 in the lead leading from the terminal $R_c$ to the primary winding 53 of the differential hybrid transformer 30 will pass only the marker-tone information and not the basic signaling power. This marker tone then would be transmitted as previously described to the appropriate line tap unit, appearing as a voice-frequency tone of a specific frequency at its T and R terminals. If the specific tone transmitted was that which was assigned to the subscriber signaling unit 50 of the party being called, then this subscriber unit will respond and place a DC battery-derived voltage on the bell 140 of the subscriber's telephone 25 causing it to ring. When the subscriber answers the telephone, placing it in an off hook condition, the line tap unit transmitter is turned on, as previously described. The carrier-frequency energy from the line tap unit is detected at the central office terminal 21 and, through the control amplifier 312, it controls the relay 308 whose contacts 309 bridge the small capacitor 307. Again, closure of these contacts places a resistant circuit condition between the terminals to $T_c$ and $R_c$ of the central office switching equipment. This resistance-circuit condition which corresponds to an answered condition from a normal telephone instrument, causes the central office switching equipment to cut off or trip the ring, to remove ringing voltage from the line and then cut through the called party to the calling party subscriber, which would then complete the transmission circuit, as described previously. The termination of the call would be made in exactly the same manner as described in the previous illustration of call establishment.

To those skilled in the art to which this invention relates, many changes in construction widely differing embodiments and applications of the invention will suggest themselves without departing from the spirit and scope of the invention. The disclosures and the description herein are purely illustrative and are not intended to be in any sense limiting

We claim:

1. A line tap unit adapted for connection with a two-conductor transmission line extending from a central office terminal unit of a telephone distribution system, said line tap unit comprising:
 a receiver section and a transmitter section adapted to operate at different predetermined frequencies, said receiver section including regulator means for comparing a received signal against a fixed reference and for producing a feedback signal within the unit proportional to the difference between the received signal and the fixed reference, said transmitter section including attenuator means responsive to said feedback signal for adjusting its output level.

2. The line tap unit as described in claim 1 including:
 filter means in said receiver section for selecting energy being carried by said transmission line at a predetermined carrier frequency through a first coupling transformer associated with the particular channel unit;
 said attenuator means including a first controllable attenuator connected to said filter means in said receiver section and a second controllable attenuator in said transmitter section of the line tap unit;
 amplifier means connected to said first controllable attenuator;
 means for detecting the amplitude of the output of said amplifier means, said regulator means being connected to receive a signal from said means for detecting and providing an output signal proportional to a fixed predetermined reference level for controlling said first controllable attenuator.

3. The line tap unit as described in claim 2 including a voice-frequency low-pass filter for deriving the voice-frequency energy in the output signal from said means for detecting while blocking the carrier-frequency energy;
 means for amplifying and expanding the derived voice-frequency energy and providing it at output terminals of the line tap unit through a second coupling transformer connected to a subscriber's telephone.

4. The line tap unit as described in claim 3 which wherein said transmitter section comprises:
 a compressor means connected to said second coupling transformer for amplifying and dynamically compressing the voice-frequency energy derived therefrom;
 oscillator means for creating carrier-frequency energy of a predetermined frequency;
 modulator means for impressing voice-frequency energy on the carrier-frequency energy derived from said oscillator means, said second controlled attenuator being connected to said modulator means and to said first controlled attenuator and thereby responsive to the output of said regulator for controlling the signal level of the output from the transmitter section of the unit which is coupled to said transmission line through said first coupling transformer.

5. The line tap unit as described in claim 3 wherein said regulator means in said receiver section comprises:
 a transistor with base, collector and emitter terminals having its base terminal connected to said means for detecting and thereby supplying one component of an input signal;
 a preset reference voltage circuit connected to the emitter of said transistor and to the base lead connection from said means for detecting;
 and means connecting the collector of said transistor to said first controlled attenuator, whereby said transistor will conduct more current through its collector connection when the base-bias voltage exceeds the emitter voltage, thereby causing the attenuator means to control the transmitter output level of the unit.

6. The line tap unit as described in claim 5 wherein said first and second attenuators are comprised of a plurality of diodes connected in series in a lead extending from said collector connection of said transistor and a ground potential junction and connected at intermediate junctions to said receiver section between said filter means and said amplifier and to the transmitter section of said line tap unit between its modulator and its amplifier.

7. The line tap unit of claim 3 wherein said means in said receiver section for amplifying and expanding the received voice-frequency energy comprises:
 a DC control amplifier and an amplifier and an amplifier transistor connected in parallel;
 means in the receiver section for supplying voice-frequency energy to the amplifier input and to a base connected lead of said transistor;
 resistor means in a lead connecting the transistor collector and said base lead and resistor means in a lead connecting the transistor emitter and the base lead;
 means for controlling the gain of said amplifier transistor including a capacitor having a bypassing impedance and a diode having a series impedance, both arranged in a network connected to the emitter of said transistor;
 means for connecting said diode to the output of said control amplifier, thereby controlling its series impedance, the diode series impedance being thus responsive to the voice-frequency energy input to the expander means;
 whereby an increase in input level to the expander will result in an even greater increase in its output level from the transistor collector 8. The line tap unit as described in claim 4 wherein said compressor means comprises:
 a resistor and a diode in series forming a variable attenuator having an input supplied with voice-frequency energy at a relatively high level, said diode having a variable shunt impedance for controlling the amount of attenuation;
 a DC control amplifier responsive to the signal level at its input and having an output connected to said diode;
 a voice-frequency amplifier;
 means for capacitively coupling voice-frequency energy through said variable attenuator and feeding it into said voice-frequency amplifier;
 means for supplying the output from said voice-frequency amplifier and thus from said compressor means to said control amplifier and also to said modulation means of said transmitter section.

9. A line tap unit adapted for connection with a transmission line extending from a central office terminal unit of a telephone system to form a subscriber's station remote from the central office, said tap unit comprising:
 a receiver section and a transmitter section adapted to operate at different predetermined frequencies and including an automatic coordination control means comprising an automatic gain-control means in said receiver section for comparing a received signal against a fixed reference and providing a feedback signal, and attenuator means in said transmitter section connected to and controlled by said automatic gain-control means for adjusting the output of said transmitter section.

UNITED STATES PATENT OFFICE

CERTIFICATE OF CORRECTION

Patent No. 3,603,744 Dated September 7, 1971

Inventor(s) Lester O. Krasin, et al

It is certified that error appears in the above-identified patent and that said Letters Patent are hereby corrected as shown below:

On the cover sheet [54] "13 Drawing Figs." should read -- 8 Drawing Figs. -- . Column 1, line 9, after the word "line" insert -- and -- ; line 59, cancel "a" , first occurrence. Column 2, line 17, after "or" insert -- by -- . Column 3, after line 47, insert the following: -- Fig. 8 is a block diagram showing the automatic coordination feature of a remote terminal unit for an electronic distribution system according to our invention; -- . Column 4, line 29, "load" should read -- lead -- ; line 55, "43" should read -- 48 -- . Column 8, line 37, "and "- ", at the end of the line, should be canceled and the word -- the -- inserted. Column 11, line 10, before "(e.g. am-" insert -- on the carrier frequency energy in such a manner as to cause the carrier frequency energy to vary in amplitude in accordance with variations of the voice frequency energy -- . Column 13, line 5, "the", first occurrence, should read -- then -- . Column 15, line 9, after the word "construction" insert -- and -- ; line 13, "limiting" should read -- limiting. -- ; line 54, cancel "which". Column 16, line 24, cancel "and an amplifier", first occurrence; line 54, after ";" insert -- and -- ; line 62, after the word "said" insert -- line -- .

Signed and sealed this 31st day of October 1972.

(SEAL)
Attest:

EDWARD M.FLETCHER,JR.
Attesting Officer

ROBERT GOTTSCHALK
Commissioner of Patents